April 20, 1971    E. C. JERABEK    3,575,723
DIVALENT SILVER OXIDE-ZINC PRIMARY CELL AND METHOD OF FORMING
Filed Dec. 17, 1969
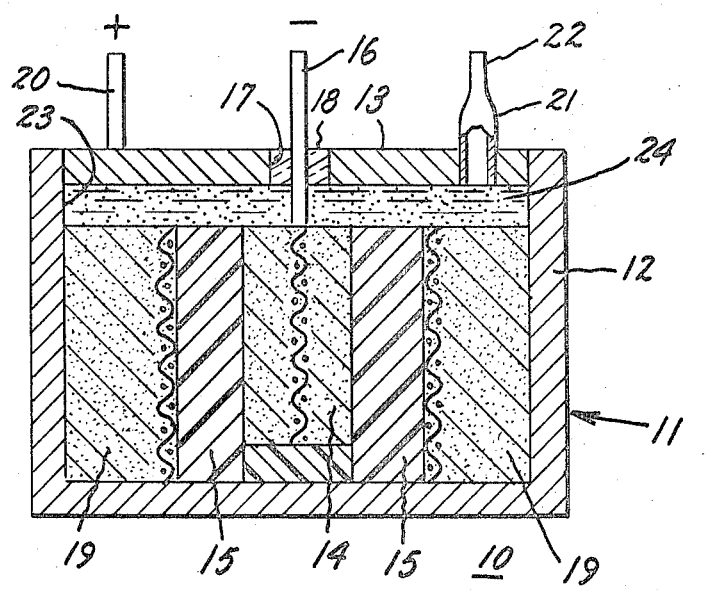
Inventor:
Elihu C. Jerabek,
by Paul R. Webb, II
His Attorney.

United States Patent Office 3,575,723
Patented Apr. 20, 1971

3,575,723
DIVALENT SILVER OXIDE-ZINC PRIMARY CELL
AND METHOD OF FORMING
Elihu C. Jerabek, Delmar, N.Y., assignor to
General Electric Company
Filed Dec. 17, 1969, Ser. No. 885,808
Int. Cl. H01m 17/00
U.S. Cl. 136—102
3 Claims

ABSTRACT OF THE DISCLOSURE

A divalent silver oxide-zinc primary cell is disclosed which comprises a casing, a zinc anode positioned in the casing, a separator on each side of the anode, a divalent silver oxide cathode on each side of the anode adjacent each separator and spaced from the anode, and a viscous electrolytic solution contained within the cell. A method is also disclosed for forming such a cell wherein a viscous electrolytic solution is added to the cell during assembly.

---

This invention relates to divalent silver oxide-zinc primary cells and to methods of forming such cells and, more particularly, to such cells containing a viscous electrolytic solution added to the cell during assembly.

A primary divalent silver oxide-zinc cell has a metallic casing with central zinc anode, normally a cellophane separator wrapped around the anode, a divalent silver oxide cathode on each opposite side of the anode and spaced therefrom by the separator, and an aqueous alkaline electrolyte in contact with the electrodes. Such batteries are manufactured generally in a charged state thereby available to produce electrical energy upon discharge.

One serious problem associated with such divalent silver oxide-zinc primary cells is that the silver oxide is not thermodynamically stable in the aqueous alkaline electrolyte. This results in the silver migrating to the zinc electrode and to the various cell components. The deposition of silver on the zinc electrode increases the direct reaction of the zinc with the electrolyte, causing a greater pressure build up in the cell as a result of hydrogen evolution, and a loss of zinc capacity. Electrolyte leakage is also possible during gas venting. Deposition on cell components, such as on the ceramic insulator, may also result in short circuits in the cell. Thus, this type of cell is subjected to an increased self-discharge rate which is undesirable.

In an effort to overcome the above problems, such cells employ cellophane or other microporous membrane-type separators adjacent the electrodes to minimize silver migration. This modification introduces another serious problem of electro-osmotic pumping of electrolyte toward the divalent silver oxide cathode, which decreases both the volume and the concentration of electrolyte adjacent the anode.

Another approach to reduce the above problems is to employ a monovalent silver oxide electrode in such a cell which is stable in the aqueous alkaline electrolyte. However, the monovalent silver oxide has only half the coulombs per cubic inch value of the divalent silver oxide electrode.

My present invention is directed to stable divalent silver oxide-zinc cells and to methods of forming such cells which eliminate or reduce substantially the above problems of silver migration, electrolyte pumping and electrolyte leakage during gas venting.

Primary galvanic cells with a porous carbon cathode are known which include during their manufacture the inclusion of an immobilized alkaline electrolyte having an aqueous alkali and a gel or paste forming material of, for example, magnesium hyroxide. A primary purpose of such immobilized electrolyte is to provide an air depolarized cell having a non-spillable electrolyte. Such a cell is described, for example, in U.S. Letters Pat. 2,180,839 issued Nov. 21, 1939, for a "Primary Cell."

Primary objects of my invention are to provide a stable divalent silver oxide-zinc primary cell with a long self-discharge life and to provide a method of forming such a cell.

In accordance with one aspect of my invention, a divalent silver oxide-zinc primary cell comprises a casing, a zinc anode positioned in the casing, at least one divalent silver oxide cathode positioned in the casing and spaced from the anode, a viscous electrolytic solution within the casing in contact with the anode and cathode, and the viscous electrolytic solution consisting of an aqueous alkaline electrolyte and 5 to 40 weight percent of magnesium oxide powder.

These and various other objects, features and advantages of the invention will be better understood from the following description taken in connection with the accompanying drawing in which:

The single figure is a sectional view of a cell made in accordance with my invention.

In the single figure of the drawing, there is shown generally at 10 a cell embodying our invention which has a metallic casing 11 including a metallic body portion 12 and a metallic cover portion 13 secured thereto. A central zinc anode 14 is shown positioned within body portion 12 and surrounded except at the top with one or more chemically inert, cellophane separators 15. An electrical lead 16 extends from anode 14 through an aperture 17 in cover portion 13. An electrically insulating, ceramic insulator 18 is positioned in aperture 17 and lead 16 passes through the insulator to the exterior of the cell. A divalent silver oxide cathode 19 is shown positioned on each side of anode 14 and spaced therefrom by separators 15. An electrical lead 20 is attached to cover portion 13 for cathodes 19 which are in electrical contact with both body portion 12 and cover portion 13. A tube 21 is provided in cover portion 13 to seal the cell as by crimping the tube at 22. A vent (not shown) can be employed if a vented cell is desired rather than a sealed cell. A chamber 23 which is defined by the space above the electrodes and separators, and below the cover portion, is shown filled with a portion of a viscous electrolytic solution 24 which consists of an aqueous alkaline electrolyte and 5 to 40 weight percent of magnesium oxide.

I found that I could form a sealed divalent silver oxide-zinc primary cell by providing a casing, providing a zinc anode positioned in the casing, providing at least one silver oxide cathode positioned in the casing and spaced from the anode, adding a viscous electrolytic solution consisting of an aqueous alkaline electrolyte and 5 to 40 weight percent of magnesium oxide powder within the casing, closing the casing, and sealing the cell. While a vented cell can be employed, a sealed cell is preferred to eliminate further leakage of electrolyte.

Various aqueous electrolytes can be employed such as sodium hydroxide, potassium hydroxide, potassium zincate. etc. I prefer to use a metal casing for the cell but this is not essential. I prefer also to employ a pair of silver oxide cathodes rather than a single cathode and to surround substantially the central zinc anode with at least one chemically inert separator.

Various amounts of magnesium oxide powder, a unique material for use with divalent silver oxide-zinc electrodes, can be employed in an alkali hydroxide electrolyte to form the electrolytic solution. The preferred range of magnesium oxide powder is 5 to 40 weight percent of the electrolyte.

Divalent silver oxide electrodes are not stable in alkaline electrolytes. While such electrodes are very desirable in high energy density batteries because of their high coulombs per cubic inch value, the above instability produces a serious problem of increased self-discharge rate with resultant shortened cell life.

In copending application Ser. No. 838,066 filed July 1, 1969, in the names of Robert P. Hamlen and Elihu C. Jerabek entitled "Silver Oxide-Zinc Primary Cell and Method of Forming" there are described and claimed methods of activating an assembled divalent silver oxide-zinc primary cell. One of the methods comprises mixing together 5 to 40 weight percent of magnesium oxide powder in an aqueous alkaline electrolyte thereby forming a pourable electrolytic solution, filling the assembled cell with the electrolytic solution, and allowing the viscosity of solution to increase prior to discharging the cell. In this manner, the shelf life is increased since the electrolyte is added prior to actual use as opposed to during assembly of the cell. Thus, no self-discharge occurs prior to the activation of the cell.

I have discovered unexpectedly that an aqueous alkaline electrolyte can be added to a divalent silver oxide-zinc primary cell during assembly and prior to cell closing or sealing without the serious disadvantage of shortened cell life caused by high self-discharge rates. This totally unexpected improvement in the cell is accomplished by adding such an electrolyte in the form of a viscous electrolytic solution which consists of the aqueous alkaline electrolyte and 5 to 40 weight percent of magnesium oxide.

I found that this electrolytic solution stabilizes the previously unstable divalent silver oxide electrode in contact with an aqueous alkaline electrolyte by causing the divalent silver oxide to lose its charge or electrical capacity at a slower rate. I have found that a cell can employ a divalent silver oxide electrode with its desirable high coulombs per cubic inch value without the serious disadvantage of high self-discharge. My cell has also the desirable effects from such an electrolytic solution of elimination of silver migration, electrolytic pump, and leakage of electrolyte.

The following examples show the difference in the self-discharge rate of divalent silver oxide electrodes when the electrodes are subjected, respectively, to an aqueous alkaline electrolyte and to a viscous electrolytic solution as described in my invention, and incorporated subsequently into cells which are discharged.

EXAMPLES 1–7

In each of these examples, a 10 gram divalent silver oxide electrode with a silver current collector attached thereto was immersed in an aqueous alkaline solution contained in a beaker. Each of these electrodes had a theoretical capacity of 4.28 amp-hours. Each beaker was placed in an oven and maintained at a temperature of 110° F. for three months. At the end of this time period, the beakers were removed from the oven. The electrodes were removed from their respective beakers and washed in distilled water.

Table I sets forth the composition of the aqueous electrolyte or viscous electrolytic solution in which each of the seven electrodes was immersed as described above.

TABLE I

| Example No.: | Solution |
| --- | --- |
| 1 | 20% KOH. |
| 2 | 20% KOH+7.5% MgO. |
| 3 | 30% NaOH. |
| 4 | 30% NaOH+7.5% MgO. |
| 5 | 30% NaOH+15% MgO. |
| 6 | 42% $K_2ZnO_2$. |
| 7 | 42% $K_2ZnO_2$+7.5% MgO. |

EXAMPLES 8–14

Each of the above electrodes from Examples 1–7 was placed in a new beaker containing 20 weight percent potassium hydroxide. Each of these electrodes was employed as the cathode while a nickel plaque was employed as the anode to provide a divalent silver oxide cell. A power source was connected across the cell electrodes to provide a constant current of 1000 milliamperes to discharge completely each of these cells. Upon total discharge of each of these cells, a percentage self-discharge per year was calculated since the initial capacity was known. Each of these cells 8–14, which employed a divalent silver oxide electrode from Examples 1–7, is set forth below in Table II with its percentage of self-discharge per year.

TABLE II

| Example No.: | Percent self-discharge per year |
| --- | --- |
| 1 | 20.3 |
| 2 | 18.1 |
| 3 | 15.9 |
| 4 | 15.2 |
| 5 | 10.1 |
| 6 | 57.2 |
| 7 | 27.1 |

The above examples show that where a cell of my invention with a viscous electrolytic solution was employed there was a definite lowering of the self-discharge rate. This is of particular significance since present divalent silver oxide-zinc batteries are intended to provide 90+% efficiency on a one year discharge rate.

While other modifications of the invention and variations thereof which may be employed within the scope of the invention have not been described, the invention is intended to include such as may be embraced within the following claims:

What I claim as new and desire to secured by Letters Patent of the United States is:

1. A divalent silver oxide-zinc primary cell comprising a casing, a zinc anode positioned in the casing, and at least one divalent silver oxide cathode positioned in the casing and spaced from the anode, a viscous electrolytic solution within the casing in contact with the anode and cathode, and the viscous electrolytic solution consisting of an aqueous alkaline electrolyte and 5 to 40 weight percent of magnesium oxide powder.

2. In a divalent silver oxide zinc cell as in claim 1, in which the anode is positioned centrally within the casing and surrounded substantially with at least one chemically inert separator, and a cathode is positioned on each side of the anode and spaced therefrom by the separator.

3. A method forming a sealed divalent silver oxide-zinc primary cell which comprises providing a casing, providing a zinc anode positioned in the casing, providing at least one silver oxide cathode positioned in the casing and spaced from the anode, adding a viscous electrolytic solution consisting of an aqueous alkaline electrolyte and 5 to 40 weight percent of magnesium oxide powder, closing the casing, and sealing the cell.

References Cited

UNITED STATES PATENTS

| 1,864,652 | 6/1932 | Heise | 136—154 |
| 2,536,699 | 1/1951 | Ruben | 136—107A |

ALLEN B. CURTIS, Primary Examiner

C. F. LEFEVOUR, Assistant Examiner

U.S. Cl. X.R.

136—157